United States Patent [19]
Wycech

[11] Patent Number: 5,124,186
[45] Date of Patent: Jun. 23, 1992

[54] COMPOSITE TUBULAR DOOR BEAM REINFORCED WITH A REACTED CORE LOCALIZED AT THE MID-SPAN OF THE TUBE

[75] Inventor: Joseph S. Wycech, Grosse Pointe Woods, Mich.

[73] Assignee: MPA Diversified Products Co., St. Clair Shores, Mich.

[21] Appl. No.: 567,393

[22] Filed: Aug. 14, 1990

Related U.S. Application Data

[63] Continuation-in-part of Ser. No. 475,396, Feb. 5, 1990, Pat. No. 4,978,562.

[51] Int. Cl.⁵ .......................... B32B 1/06; B32B 1/08
[52] U.S. Cl. .......................... 428/35.8; 52/793; 52/810; 264/46.6; 296/146; 296/188; 428/36.5; 428/71
[58] Field of Search .......... 428/35.8, 36.5, 71; 52/793, 810; 264/46.6; 296/146, 188

[56] References Cited

U.S. PATENT DOCUMENTS

| | | | |
|---|---|---|---|
| 3,763,858 | 10/1973 | Buese | 428/316.6 |
| 3,868,796 | 3/1975 | Bush | 52/618 |
| 3,964,208 | 6/1976 | Renner et al. | 49/502 |
| 4,013,317 | 3/1977 | Reidelbach et al. | 296/146 |
| 4,090,734 | 5/1978 | Inami et al. | 296/146 |
| 4,307,911 | 12/1981 | Pavlik | 296/188 |
| 4,378,395 | 3/1983 | Asoshina et al. | 428/158 |
| 4,737,407 | 4/1988 | Wycech | 428/323 |
| 4,751,249 | 6/1988 | Wycech | 521/54 |
| 4,836,516 | 6/1989 | Wycech | 267/279 |
| 4,923,902 | 5/1990 | Wycech | 521/54 |
| 4,978,562 | 12/1990 | Wycech | 428/35.8 |

FOREIGN PATENT DOCUMENTS 59-34921 2/1984 Japan.
0236291 9/1987 PCT Int'l Appl..

Primary Examiner—William J. Van Balen
Attorney, Agent, or Firm—Dykema Gossett

[57] ABSTRACT

A lightweight, composite beam with a reacted core for reinforcing a vehicle door is provided. The reinforcing beam comprises a metal tube having a longitudinal cavity which is partially filled with either a reinforcing polymeric core which in one aspect includes a thermoset or thermoplastic resin-based material or a cementitious core which includes Portland cement and a filler. The reacted core is friction fit or mechanically held within the metal tube at the mid-span of the tube. The composite beam includes end pieces which are adapted to be mounted to a vehicle door panel in a door cavity by spot-welds or the like. The horizontally mounted beam provides substantially increased resistance to side impacts to the vehicle door in the event of a collision.

29 Claims, 2 Drawing Sheets

COMPOSITE TUBULAR DOOR BEAM REINFORCED WITH A REACTED CORE LOCALIZED AT THE MID-SPAN OF THE TUBE

RELATED PATENT APPLICATION

This patent application is a continuation-in-part application of my copending application, Ser. No. 07/475,396, filed Feb. 5, 1990 now U.S. Pat. No. 4,978,562.

TECHNICAL FIELD

The present invention relates generally to vehicle door reinforcements, and more specifically provides a composite tubular doo beam having a reacted core which is either a resinous or a cementitious core localized at the mid-span of the tube.

BACKGROUND OF THE INVENTION

Modern motor vehicle design emphasizes safety features which protect vehicle occupants in the event of a collision. To this end, reinforced structures have been developed with the objective of increasing motor vehicle body strength without unduly increasing overall vehicle weight and cost.

As will be appreciated by those skilled in the art, perhaps the most significant advance in recent years in materials technology for motor vehicle design is the development of composite materials. In that regard, the inventor of the present invention has developed a number of composite structures and methods of forming composites and their constituent elements. For example, in U.S. Pat. No. 4,737,407 which issued Apr. 12, 1988, the inventor of the present application discloses thermoset plastic pellets and a method and apparatus for making the pellets. In U.S. Pat. No. 4,751,249 which issued Jun. 14, 1988, the inventor of the present invention discloses a reinforcement insert for a structural member and a method of making and using the insert. In U.S. Pat. No. 4,836,516 (the disclosure of which is incorporated herein by reference), the inventor of the present invention discloses a filled tubular torsion bar which is reinforced by a mixture of a resin-based filler. In U.S. Pat. No. 4,923,902, issued May 8, 1990, (the disclosure of which is incorporated herein by reference), the present inventor discloses a method of making a composite door beam which is mounted within the door cavity of a vehicle. The door beam includes a lightweight channel-shaped member having a foam core disposed therein.

Most motor vehicle doors generally have an outer door panel or skin and an inner door panel in spaced relation such that a door cavity is defined. Disposed within the door cavity are various door systems such as locking mechanisms and lowerable window actuating means. Without further structural reinforcements, these hollow motor vehicle doors are often not adequately resistant to side impacts. That is, when a motor vehicle door of this type is struck during a collision or the like, the inner and outer door panels offer only limited resistance to side intrusion. Hence, it will be appreciated that there is a need for structurally reinforced motor vehicle doors to provide greater impact resistance.

Reinforcing structures, known variously as impact beams, intrusion beams, guard beams and the like, have also been proposed by others for use in motor vehicle doors to provide improved side impact resistance. For example, U.S. Pat. No. 4,090,734 to Inami et al., entitled "Reinforcement Member for an Automobile Door," discloses a door beam that provides side impact-resistant strength to a vehicle door. The door beam includes a central section formed from a plate having end pieces attached thereto. The central section is disclosed as having an undulation. In U.S. Pat. No. 3,964,208 to Renner et al., entitled "Door for Vehicle, Especially Passenger Motor Vehicle," there is disclosed a reinforced motor vehicle door which includes an intermediate panel with undulations which form cavities when mated to the outer door skin. It is stated that these cavities can be filled with a synthetic resin-based foam material. In U.S. Pat. No. 4,378,395 to Asoshina et al., entitled "Reinforcing Material," a material for reinforcing a panel is disclosed which includes a resin that conforms to a preselected surface of a vehicle door. In U.S. Pat. No. 3,868,796 to Bush, entitled "Side Door Intrusion Protection," a composite beam for reinforcing an automobile door is disclosed in which the outer skin panel of the vehicle door is integrated as part of the beam. A corrugated inner panel is welded to the outer skin, and the voids created thereby are filled with foam.

In U.S. Pat. No. 4,013,317 to Reidelbach et al., entitled "Lateral Protection for Motor Vehicles," a door beam and door reinforcement structure are disclosed which comprise a sheet-metal closure panel. In U.S. Pat. No. 4,307,911 to Pavlik, entitled "Reinforcement Means for Resisting Side Impacts Against an Automobile Door," a horizontal door beam reinforcement is disclosed which includes a beam that is secured by an adhesive or the like to the outer door panel. The beam may include channel sections for increased strength. In European Patent Application No. 87-251774/36, a reinforcement structure is disclosed for a car door which comprises a plastic layer in which a metal reinforcing strip is embedded. In European Patent No. 59-34921, a hat-shaped section in the nature of an impact beam is described which is mounted within a vehicle door to increase side impact strength.

As will be appreciated by those skilled in the art, Federal Motor Vehicle Safety Standards mandate that vehicle side doors have a minimum specified strength in resisting side impacts. Side intrusion resistance is typically measured with a hydraulic ram which is pressed into the outer door panel. As the door is crushed 18 inches into the vehicle, specific loads must be met.

In order to more fully appreciate the performance characteristics of the present invention, an explanation of flexure theory of a simple beam will now be described. In a simple beam, the beam are being supported such that the span between the supports is free to move in the vertical plane under a load perpendicular to the transverse beam axis. In three-point beam deflection testing, and referring now to FIG. 9 of the drawings, a load P perpendicular to the transverse axis of beam A having span L is applied at the mid-point of the beam. In other words, FIG. 9 illustrates a simple beam having a concentrated load applied an equal distance from the end supports. Accordingly, the maximum bending moment (1b.-in.) is equal to the product of P, concentrated load (lb.) times the length of the beam (in.) divided by 4:

$$M = \frac{PL}{4}$$

Graphically, in terms of a moment diagram this relationship is shown in FIG. 10 of the drawings. The theoretical maximum elastic deflection at the center of the span may be determined as follows:

$$Y = \frac{MPL^3}{48EI}$$

Where Y is maximum deflection in inches, P is concentrated load in pounds, E is modulus of elasticity in PSI, and I is moment of inertia in inches raised to the fourth power. As will be explained more fully herein, the novel impact beam provided by the present invention optimizes the beam's strength for centrally disposed loads in a highly effective manner which reduces both cost and beam weight.

It will be appreciated that the peak bending load of an impact beam is a function of the tensile strength of the beam. Hence, for the purposes of impact beam performance, it is desirable to optimize the ratio of the maximum bending moment to the tensile strength of the beam. In addition, it is also known that the desired performance characteristics of a particular beam structure are difficult to obtain in those designs which exhibit buckling during deformation. Buckling often occurs in door beams which are formed as hollow round tubes or single hat-shaped structures.

Although large, heavy, structural reinforcements provide increased side-intrusion resistance, they also add to the total vehicle weight and usually increase material production costs. Moreover, in new automotive designs there is less space available within the vehicle for the placement of reinforcement door beams. Therefore, it would be desirable to provide a lightweight, compact door beam having a design which easily fits within a vehicle door cavity. By providing a strong yet lightweight door beam, total mass savings could be achieved. In addition, it would be desirable to provide such a door beam which could easily be fabricated from a minimum number of parts. The present invention provides such an impact or intrusion door beam having the aforementioned desirable characteristics and features.

Therefore, it is an object of the present invention to provide an improved lightweight composite impact beam for use in reinforcement a motor vehicle door.

Still another object of the present invention is to provide an improved impact resistant motor vehicle door.

It is also an object of this invention to provide a method of manufacturing a composite impact beam having a reacted core which is either a resinous core or a cementitious core localized at the beam mid-span.

SUMMARY OF THE INVENTION

In accordance with the present invention, a lightweight, compact, composite door beam is provided having a reacted core, either a resinous core or a cementitious core, localized at the mid-span of the beam. A reacted core is a core resulting from a chemical reaction. The door beam of the present invention can be easily mounted in the cavity of a hollow motor vehicle door of the type having an outer panel or skin and an inner panel. The door beam structurally reinforces the vehicle door to provide greater impact resistance to side impacts which may be sustained in a collision.

The novel door beam comprises a metal body in the form of a tube in which a reacted core of filler material is disposed. The reacted core of filler member is composed of a reinforcing filler material and is disposed within the tube bore, with the reacted core being localized at the mid-span of the tube. It is preferred that the core occupy only the center 6 to 12 inches of the tube. The reinforcing material from which the reacted core is comprised is preferably a synthetic resin-based material or a cementitious material using Portland cement and water. Hence, the door beam is a composite structure. Most preferably, the core is formed of a combination of microspheres or macrospheres, cement, water and silica fume. The core material is held within the bore of the beam by friction or by mechanical means, but is not bonded to the tube wall. At each end of the beam, mounting means are attached by which the beam can be mounted inside a door cavity to at least one door panel. Preferably, the mounting means comprise integral end pieces or end tabs having a shape corresponding to mating surfaces on the door panel to which the beam is secured.

The present invention also provides a reinforced vehicle door. The automotive door has an outer panel or skin and an inner panel which defines a door cavity that encloses various door hardware. The vehicle door is substantially reinforced against side intrusion by virtue of the novel door beam of the present invention which is mounted horizontally inside the vehicle door. In one embodiment, the end pieces of the beam are secured to the inner door panel by spot welds or the like.

In still another aspect, the present invention provides a method for fabricating the novel door beam of the present invention. In substance, a metal tube is provided which is formed by conventional tube rolling techniques. A reacted core is formed as a discrete element which is then inserted into the bore of the tube. The reacted core is urged into the tube bore to occupy the central 6 to 12 inches of the beam. The core is held in place by a friction fit in the bore or by mechanical means, but is not bonded to the inner wall surfaces of the tube. The presence of the reacted core substantially increases the bend strength and the energy absorption characteristics of the beam. In one embodiment, the end means or pieces are integral with the beam and are formed by stamping or the like after insertion of the reacted core.

Thus, the present invention provides an improved lightweight, compact door beam, a vehicle door which is reinforced with this novel door beam and a method for manufacturing the beam.

DESCRIPTION OF THE PREFERRED EMBODIMENTS

Figure 1:
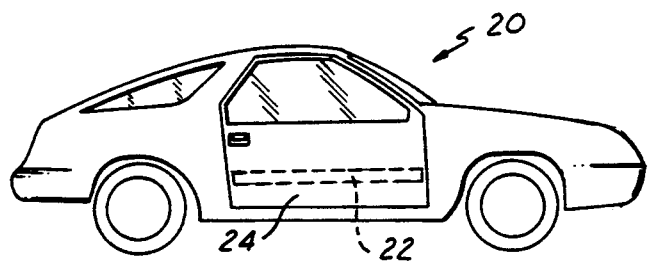
FIG. 1 is a side elevational view of a motor vehicle having the door beam of the present invention installed in the vehicle door.

Referring now to the drawings in which like reference numerals designate like parts and, more specifically, with reference to FIG. 1 of the drawings, motor vehicle 20 is shown in which composite door beam 22 is provided mounted within motor vehicle door 24 in the right-hand configuration. In the preferred embodiment, and referring now to FIGS. 2 and 3 of the drawings, door beam 22 includes body or tube 26 which defines tube bore 28 in which a reacted core, hereinafter core 30 is disposed. The core 30 may be either a resin-based core as disclosed and claimed in the parent application, Ser. No. 07/475,396 or a Portland cement-based core having a combination of ingredients such as microspheres or macrospheres, cement, water and silica fume. The length of core 30 is preferably less than one-third the length of beam 22. Most preferably, core 30 occupies the center 6 to 12 inches (length) of tube 26. In other words, length L of core 30 is from about 6 to about 12 inches, and in the most preferred embodiment, core 30 is disposed in tube 26 at the mid-section of tube 26. Core 30 is preferably positioned such that it is equidistant from each end of tube 26. Significant advantages are attained in the present invention by the relative length of core 30 and by its placement in tube 26 such that core 30 occupies less than a third of the length L' of tube 26. In this manner, only that region of beam 22 which would receive a load in a centered-load, three-point beam deflection test is reinforced. However, it is contemplated that in some applications it may be desirable to place core 30 in a portion of tube 26 other than the mid-section and placement which is offset from the midpoint is contemplated as falling within the present invention in an alternative embodiment.

Therefore, it will be seen that in one embodiment, the present invention provides superior results by the placement of a reinforcement core in only a portion of a door beam, where the core occupies less than approximately one-third of the beam length. Not only does this design reduce both the weight of beam 22 and its cost (due to the cost factors associated with core 30), but the present invention provides an impact beam of high-strength characteristics localized in the region where they are most needed.

Figures 3, 4:
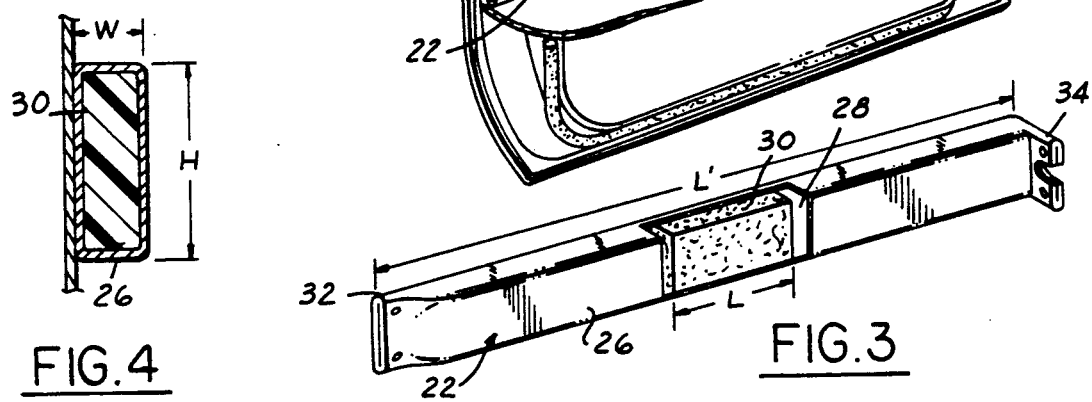
FIG. 3 is the door beam of the present invention in one embodiment broken away to expose the reacted core.
FIG. 4 is a cross-section of the door beam of the present invention taken along lines 4—4 of FIG. 2.
Figure 5:
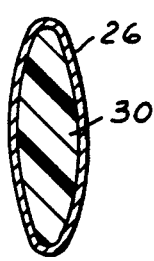
FIGS. 5 through 8 illustrate cross-sections of door beams made in accordance with the present invention having various preferred geometries.

Referring now to FIG. 3 of the drawings, beam 22 is shown having mounting means or end piece 32 at one end of tube 26 and mounting means or end piece 34 at the other end of tube 26. The length L' of beam 22 is typically from about 30 to 48 inches and bore 28 is substantially coextensive therewith. The width W of beam 22 as shown in FIG. 4 is typically about ¾ inches to 2 inches. Similarly, the beam height H will typically be from about 2 to 4 inches. In those instances where it is necessary to minimize the beam height, beam strength can be maintained by enlarging the beam width. Conversely, if a narrower door beam is needed, the loss and strength produced by narrowing the beam can be compensated by increasing the beam height.

Although a number of metals may be suitable, steel is the preferred metal for use in forming tube 26 of beam 22 and mounting end pieces 32 and 34. The gage (in inches) of the metal should be from about 0.040 to about 0.125, preferably from about 0.060 to about 0.100, and most preferably from about 0.070 to about 0.095. Preferred types of steel include HSLA 980, dual-phase 120, 140, chrome molybdenum, and high carbon 1526 alloy. Other metals may be appropriate or even suitable in some instances. In the present invention, the preferred steel should exhibit a minimum tensile elongation of 10%.

Figure 2:
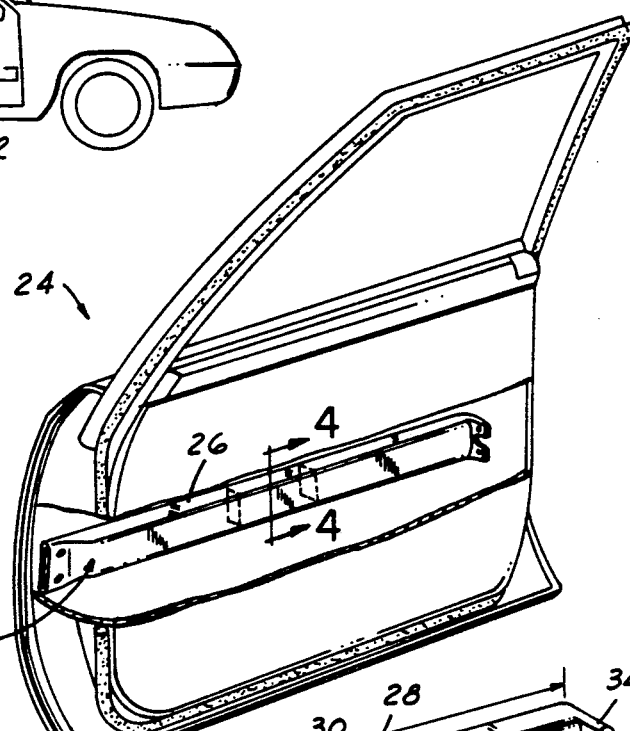
FIG. 2 is a reinforced vehicle door with the inner door panel broken away to expose the door beam of FIG. 1.

Referring now to FIGS. 2 and 3 of the drawings, end pieces 32 and 34 are shown adapted to be mounted to the inner door panel of vehicle door 24. Thus, end pieces 32 and 34 must conform to suitable mating surfaces of the inner door panel to which beam 22 is mounted. The means by which beam 22 is mounted in vehicle door 24 is preferably by spot welding beam 22 in position at end pieces 32 and 34. Five or more spot welds at each end piece 32, 34 are generally sufficient to form a rigid, reliable attachment.

Referring now to FIG. 4 and FIGS. 5 through 8, there are several preferred geometries for tube 26 for use in the present invention. Most preferred is that shown in FIG. 4 which is a generally rectangular cross-section that provides exceptional strength in the present invention. Also preferred are the ellipse shown in FIG. 5, the oval of FIG. 6, the half-oval of FIG. 7 and the corner truncated oval of FIG. 8. All of these configurations provide superior strength characteristics in accordance with the present invention.

Figure 6:
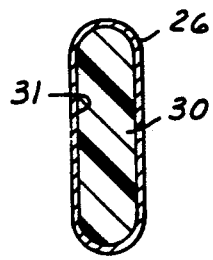
Figure 7:
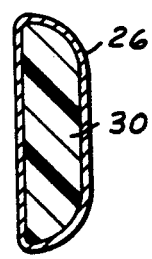
Figure 8:
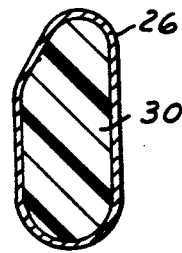
Figure 9:
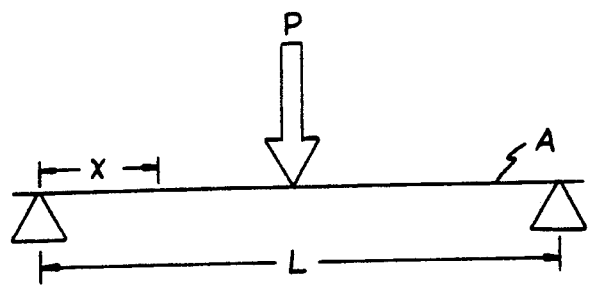
FIG. 9 is a diagram of a simple beam with a central load.

Referring now to FIG. 3 of the drawings, and as previously stated, an important feature of the present invention is that core 30 is not bonded to the inner surface of tube 26. In most instances, core 30 will be held in place by a close friction fit or mechanical interference such as a dimple, a pierced dart, or by weld flash 31 formed on the inner surface of tube 26 as shown in FIG. 6. In other words, the outer surface of core 30 is in contact with the inner surface of tube 26 and is closely received therein such that core 30 is held in place. Thus, core 30 does not move within bore 28 of tube 26 under normal conditions. By not bonding core 30 to the inner surface of tube 26, unexpected superior results are achieved during application of a load to beam 22.

More specifically, as stated and as will be more fully explained hereinafter, core 30 is formed of either a resin-based material or a Portland cement-water based system which imparts high compressive strength such that metal tube 26 flexes during deformation without buckling locally at the mid-span. That is, core 30 functions as an internal forming mandrel such that the steel deforms over the core and absorbs energy in this manner. Importantly, this non-bonded relationship between core 30 and tube 26 allows tube 26 to slip over core 30 during deformation which in turn allows the steel to stretch. Bonding of the core 30 to tube 26 causes premature cracking of the metal due to the lack of strain relief on the tension side of beam 22. In the present invention, as beam 22 deflects, core 30 cracks and forms small columns of support inside tube 26 which prevent buckling of tube 26.

In addition, by using a tube in the manufacture of beam 22, as opposed to a single hat section, important advantages are achieved. More specifically, it will be appreciated that the importance of a door beam section is to displace as much material away from the neutral axis as possible. By using a tube, the three-inch to four-inch widths act as flanges of an I beam with the core serving as an internal support to the flanges. This prevents buckling and transfers the load properly.

Figure 10:
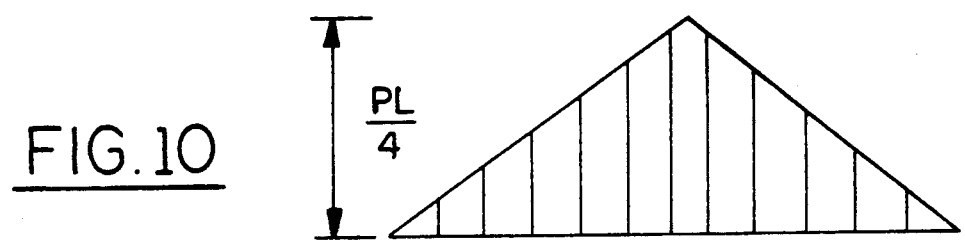
FIG. 10 is a moment diagram of the simple beam of FIG. 9.
Figure 11:
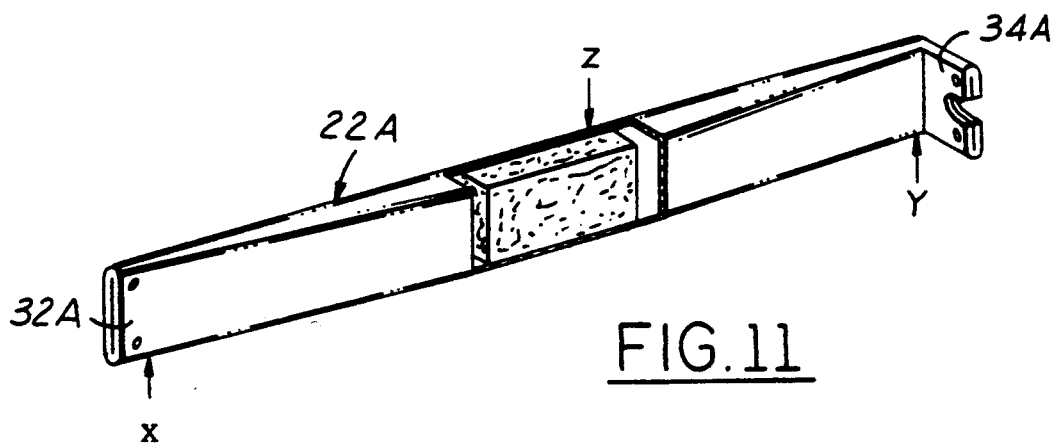
FIG. 11 is the door beam of the present invention in another embodiment.

Moreover, with respect to the rectangular configuration of beam 22 shown in FIGS. 2, 3 and 4, although the rectangular tube has a uniform thickness, the reinforcement provided by the core is such that the beam 22 performs in a three-point deflection test as if tube 26 were tapered with a thick portion at the center, i.e., tapering toward end pieces 32 and 34. This gives optimum performance as a triangular moment diagram as shown in FIG. 10. Accordingly, in another embodiment of the present invention as shown in FIG. 11, this principle is used wherein beam 22A is tapered toward end portions 32A and 34A. The difference in dimension H, i.e., the height of beam 22A at points X and Y as compared to point Z, is approximately 3 to 4 inches greater. The tapering is most preferably uniform from the center of beam 22A to each end of the beam.

RESIN-BASED CORE

The composition of a resin-based core 30 imparts excellent mechanical strength to door beam 22, particularly its bending strength, and yet adds only marginally to the overall weight of beam 22. With specific reference now to the composition of the resin-based core 30, the density of the core should be from about 15 pounds per cubic feet to about 40 pounds per cubic feet to minimize weight. An important feature of the present invention is the compressive strength exhibited by resin-based core should be at least about 1,000 pounds per square inch and most preferably about 2,000 pounds per square inch or greater. Preferably, the core should not exhibit more than 10% elongation under dynamic impact. As stated, it is important that core 30 not be bonded to metal tube 26.

The melting point of resin-based core, heat distortion temperature and the temperature at which chemical breakdown occurs must also be sufficiently high such that core substantially maintains its structure at high temperatures typically encountered in paint ovens and the like. Therefore, resin-based core 30 should be able to withstand temperatures in excess of 300 degrees F. and preferably 350 degrees F. for short times absent any significant applied stress. Also, the resin-based core should be able to withstand heats of about 180 degrees F. to 220 degrees F. for extended periods without exhibiting substantial heat-induced distortion or degradation.

Figure 12:
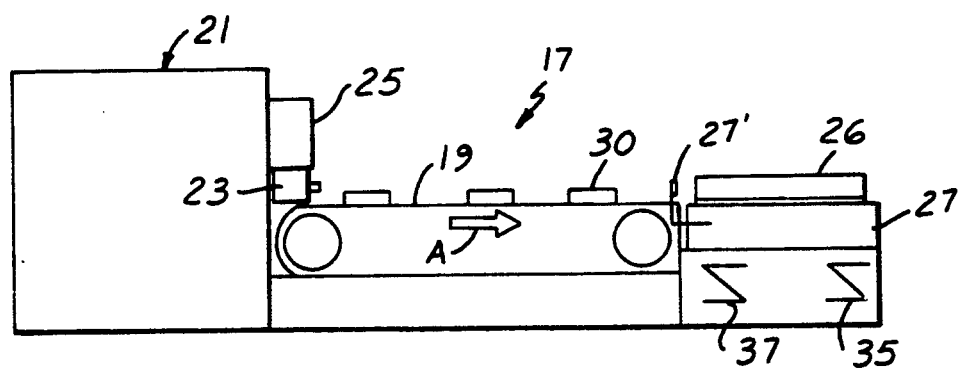
FIG. 12 is a diagramatic illustration of an apparatus for use is making the door beam of the present invention.

Beam 22 may be formed by several techniques using a resin-based material. One preferred method, and referring now to FIG. 12 of the drawings, utilizes fabrication apparatus 17. Accordingly, apparatus 17 includes a moving endless belt 19 upon which multiple resin-based cores 30 are formed and moved into position relative to tube 26. More specifically, extruder 21 is charged with the constituents which make up core 30. This mixture is then extruded as a strand through die 23. At preselected intervals, the strand is cut by knife 25 to form resin-based cores 30 of preselected lengths. In other words, a strand of material is extruded on conveyor belt 19 as it moves in the direction of arrow A and is cut to length at die 23. Multiple tubes 26 are presented by way of a second endless belt 27 which moves perpendicular to the movement of belt 19. At predetermined intervals, belt 27 stops such that the end of tube 26 is positioned to receive core 30. Arm 27 then pivots to urge core 30 into the end of tube 26 (into bore 28). As the resin-based core 30 is extruded it should have sufficient body for subsequent steps, but may in some instances require further curing on belt 19 by IR radiation or the like. Once inserted into the mouth of tube 26, articulated rams 35 and 37 move into position at each end of tube 26 and to move core 30 to the midpoint of tube 26 and to compress core 30 somewhat so that it completely fills the designated area of from about 6 to about 12 inches. A lubricant on belt 19 may be necessary to facilitate movement of core 30 into tube 26 and mill oil in tube 26 allows core 30 to slide into place. Moreover, where fabrication is carried out in this manner, mill oil in tube 26 allows core 30 to finish curing without bonding to the tube walls. A subsequent cure of the resin-based core 30 may also be achieved by heat treatment of beam 22 after fabrication and possibly after it is inserted in a vehicle door cavity.

Alternatively, the resin-based core may be precast by preparing a liquid or paste-like reinforcing material which is then injected or poured into a mold having dimensions matching those of bore 28 in which core 30 is closely received. The reinforcing material is hardened by curing or cooling to form core 30. A metal tube is provided as tube 26 which is formed by conventional tube-rolling techniques. Core 30, after it has cured, is urged into the tube bore 28 to occupy the central 6 to 12 inches of the beam. As stated, core 30 is held in place by friction fit or by mechanical means in bore 28, but is not bonded to the inner wall surfaces of tube 26. In one embodiment, the end of means or pieces 32, 34 are then formed by stamping or the like. In another embodiment, core 30 is pre-cast from pellets which are fully described in my U.S. Pat. Nos. 4,737,407 of Apr. 12, 1988 and 4,751,249 of Jun. 14, 1980 (the disclosures of which are incorporated herein by reference). Therein, the pellets are heated to partially melt a surface layer or region of the pellets such that the pellets bond together in a mold cavity to form a matrix having interstices. Core 30 is thereafter inserted into position.

In more detail, the resin-based core 30 includes a synthetic resin, a cell-forming agent, and a filler. A synthetic resin comprises from about 35.0 percent to about 95.0 percent by weight, preferably from about 75.0 percent to about 94.0 percent by weight, and most preferably from about 78.0 percent to about 90.0 percent by weight of core 30. As used herein, the term "cell-forming agent" refers generally to agents which produce bubbles, pores, or cavities in core 30. That is, the resin-based core 30 has a cellular structure, having numerous cells disposed throughout its mass. As will be seen, this cellular structure provides a low-density, high-strength material, which, in the structure of door beam 22, provides a strong, yet lightweight member. Cell-forming agents which are compatible with the present invention include reinforcing "hollow" microspheres or microbubbles which may be formed of either glass or plastic. Plastic microspheres may be either thermosetting or thermoplastic and either expanded or unexpanded. In one embodiment, unexpanded microspheres are used which are then expanded in a mold cavity to form the resin-based core 30. The preferred microspheres are from about 1.0 to about 250 and preferably from about 10 to about 180 microns in diameter. The cell-forming agent may also comprise a larger lightweight material such as macrospheres of greater than 400 microns in diameter. Also, the cell-forming agent may compromise a blowing agent which may be either a chemical blowing agent or a physical blowing agent. Glass microspheres are particularly preferred. Where the cell-forming agent comprises microspheres or macrospheres, it constitutes from about 1.0 percent to about 60.0 percent by weight, preferably from about 1.0 percent to about 35.0 percent by weight, and most preferably from about 3.0 percent to about 20.0 percent by weight of core 30. Where the cell-forming agent comprises a blowing agent, it constitutes from about 1.0 percent to about 10.0 percent by weight, preferably from about 1.0 percent to about 5.0 percent by weight, and most preferably from about 3.0 percent to about 5.0 percent by weight of core 30. Suitable fillers include glass or plastic microspheres, silica fume, calcium carbonate, milled glass fiber, and chopped glass strand. Glass microspheres are particularly preferred. Other materials may be suitable. A filler comprises from about 1.0 percent to about 55.0 percent by weight, preferably from about 5.0 percent to about 24.0 percent by weight and most preferably from about 7.0 percent to about 19.0 percent by weight of the resin-based core 30.

Preferred synthetic resins for use in the present invention include thermosets such as epoxy resins, vinyl ester resins, thermoset polyester resins, and urethane resins. The average molecular weight of the resin component is from about 1,000 to about 5,000,000 and preferably from about 10,000 to about 1,000,000, although molecular weights outside of these ranges may be slitable or desirable in some applications. It is not intended that the scope of the present invention be limited by molecular weight of the resin. Where the resin component of the liquid filler material is a thermoset resin, various accelerators, such as "EMI-24" (imidazole accelerator) and "DMP-30," and curing agents, preferably organic peroxides such as "MEK" peroxide and "Percadox," may also be included to enhance the cure rate. A functional amount of accelerator is typically from about 0.1 percent to about 4.0 percent of the resin weight with a corresponding reduction in one of the three components, resin, cell-forming agent or filler. Similarly, the amount of curing agent used is typically from about 1 percent to about 4 percent of the resin weight with a corresponding reduction in one of the three components, resin, cell-forming agent or filler. Effective amounts of processing aids, stabilizers, colorants, UV absorbers and the like may also be included in core 30. Thermoplastics may also be suitable.

In the following tables, preferred formulations for resin-based core 30 are set forth. It has been found that these formulations provide a core 30 which imparts unexpected superior strength to door beam 22.

| INGREDIENT | PERCENTAGE BY WEIGHT | INGREDIENT | PERCENTAGE BY WEIGHT |
| --- | --- | --- | --- |
| FORMULA I | | FORMULA II | |
| Polyester Resin ("AZS-137-69") | 80.9 | "Interez 504 Epoxy" | 56 |
| | | "Interez 855 Hardener" | 26 |
| "Percadox 16N" | 1.1 | | |
| "3M C15" | 18 | "3M C15" | 18 |
| FORMULA III | | FORMULA IV | |
| Polyester Resin ("ARISTECH 13031") | 48.8 | "Interez 510 Epoxy" | 59.4 |
| | | "Interez 501 Epoxy diluent" | 6.6 |
| "Percadox 16N" | 0.7 | | |
| "SG Micros" (PA IND) | 50.5 | "EMI 24" | 1.5 |
| | | "3M B23" | 21.5 |
| | | "SG Micros" | 11 |

It is to be understood that the reinforcing material from which the resin-based core 30 is formed is such that core 30 reinforces tube 26 so that tube 26 resists collapse during the gross deflection of door beam 22. Without core 30, tube 26 would buckle prematurely. If door beam 22 were allowed to buckle, it would lose its structural efficiency and load-carrying capacity. It is preferred that the weight of resin-based core not exceed about 4.5 pounds. It is preferred that the overall weight of door beam 22 be less than 12 pounds and most preferably less than 10 pounds for two-door vehicles. Core 30 provides from about 40 percent to about 100 percent or more increase in the load-carrying capacity of door beam 22.

CEMENTITIOUS CORE

It has been found that a Portland cement-based core, also formed by a chemical reaction as in a resinous-based core, may be used as a filler in certain automotive tubular components such as door beams, door belt lines, pillars and other tubular components having small cross-sections or small volume areas. The amount of Portland cement-based core material used per component application is approximately 0.50 gallon and is made in either a pumpable or extrudable form.

The Portland cement-based core material has certain inherent advantages over the resinous-based core materials disclosed previously. The cured modulus of cement and water can be as high as 3,000,000 psi, while the modulus of a heat cured resin can be as high as 300,000 psi. The heat cured resin systems disclosed herein have reached a modulus of approximately 150,000 psi.

Another advantage is that the cement-water base system will, when cured, result in a core which is stiffer than the syntactic foams or resin based core for approximately the same weight.

To overcome the problem of cement weight versus weight of the syntactic materials, the cementitious mix has a combination of microspheres or macrospheres, cement, water and silica fume.

In the following tables, preferred formulations for the cement-water based mixes for the reacted core 30 are set forth.

| INGREDIENT | FORMULA V (STANDARD MIX) (PARTS BY WEIGHT) | FORMULA VI (LIGHTWEIGHT MIX) (PARTS BY WEIGHT) |
| --- | --- | --- |
| Cement | 100 | 100 |
| Expancel 551 DE | 1.63 | 1.63 |
| EMSAC F100T | 10 | 10 |
| SG | 0 | 31.3 |
| Water | 45 | 50 |
| Density Dry Cement | 40 PCF | 35 PCF |
| Density Wet Cement | 76 PCF | 66 PCF |

A microballon or microsphere product of Expancel Corporation, called #551 DE was selected because of its physical characteristics. It is a thermoplastic microsphere approximately 100 microns in diameter. It is lightweight and provides density reduction, material property enhancement, and process feasibility.

The standard mix is made with an equal volume of cement, Portland Type 1A or Type 1, as defined in the book of the Portland Cement Association entitled "Design and Control of Concrete Mixtures", Eleventh Edition (Library of Congress catalog card number 29-10592) and an equal volume of Expancel 551 DE.

The bulk density of the Portland Type 1A cement is approximately 75 to 80 pounds per cubic feet. The bulk density of the Expancel 551 DE is 1.5 pounds per cubic feet. By combining the two in equal amounts, the specific gravity of the combined mix dry is 35 to 40 pounds per cubic feet or approximately one half the weight of the cement.

The amount of water added to the mix is between 40% to 60% of the weight of the cement. Thus, if the mix has 800 grams of cement, 400 grams of water would be added. The mix has 13 to 15 grams of the Expancel 551 DE.

The Expancel 551 DE has a number of advantages in the cementitious mix. First, it reduces the dry density of the mix to approximately one half of the density of the cement. Second, the Expancel 551 DE thermoplastic microsphere is insoluble in water and compresses or deflects under pressure. This permits the resulting mix to be pumped by using conventional cement or concrete type of equipment used to pump aggregate and cement together.

Since the Expancel 551 DE acts as a pumping lubricant and for mass reduction, it also allows the cement to have a reduced slump as a result of the reduction in mass and the reduction in the allowed water content. Since the Expancel 551 DE "bubble" is light, stiffer materials can be pushed or worked because of the compliance of the bubble, less water is required but still results in the cement being pumpable or extrudable.

This results in the improvement in the cured properties of the cement. The critical parameter for cure properties in cement is the ratio of water to cement. Optimum ratio of water to cement is 0.40. Higher water to cement ratios yield shrinkage cracks during curing, more cured product porosity and possible moisture entrapment.

The Expancel 551 DE has a mechanism to reduce the water content and to improve the properties in addition to reducing the mass and improving the pumpability of the mix. The mix, by itself, when cured will be anhydrous which means that the cured mix will still absorb moisture from the air or when in contact with water. Thus, the cured mix, by itself, should not be used in a vehicle which is exposed to road splash or to submergence or accumulations of moisture due to rain or weather.

The Portland Cement-Expancel 551 DE combination is improved in its moisture resistance characteristic by the addition of silica fume, sold under the trademark EMSAC and supplied by Elkem Company. Silica fume is a dust material collected from flu gas stacks. The silica dust are tiny inert particles, 15 microns in diameter. When the silica inert particles are added to the dry cement mix, the particles clog the interstitial spaces between the cement particles and the microballons. The silica fume particles clog the pores between the cement and thereby vastly improve the moisture resistance of the cured product. The amount of silica fume added is from about 5% to 20% by weight of cement.

There are two versions of silica fume, one treated and the other one not treated. The treated silica fume has a plasticizer which also lubricates the mix and reduces the water content further, possibly even by 30%.

There are several advantages for using this cementitious core in the automotive industry whether it is pumped directly into the car or extruded into a bar which is placed in a door beam of the vehicle. One advantage is in substantial savings in the cost per unit gallon. The cementitious mix is approximately ⅓ the cost of the syntactic mixes disclosed herein. One epoxy syntactic mix cost $6.00 per gallon. A polyester mix is in the range of $4.00 to $5.00 a gallon in raw material costs. The cementitious mix has a raw material cost in the range of $1.25 to $1.50 per gallon.

Still another advantage of the cementitious mix formulation is in the area of toxicology. The cement material may be mixed with water, as an example, at an automobile assembly plant and thereafter pumped directly into a vehicle without concern for exhaust fumes, dermatitis, contact with eyes, additional ventilation requirements, flammability problems and other toxicology issues encountered when resin systems and paints are used.

Another advantage is that the cementitious mixture is somewhat forgiving in that there is some flexibility in the amount of water that can be added since in a water base system the pumping and associated equipment is easy to clean and fire hazards are substantially reduced when compared to resin based systems.

A further advantage is that in the finished product the cured cement has a higher temperature resistance over the temperature resistance of the plastic type of syntactic foams.

Another key parameter is that the compressive modulus is much greater than a polyester or an epoxy syntactic foam. This means that the stiffness enhancement would be increased. The areas of application would be in low volume pumpable areas of a vehicle such as in door belt lines, upper door frames and pillars. In a door beam, the cement mix would be extruded directly onto a belt and placed in the rectangular metal tube of the door beam.

To increase the moisture resistance of the finished product, other materials can be used in place of the silica fume. These are water born materials such as a latex manufactured by Dow Chemical Co. of Midland, Mich. or a water base urethane, acrylic, or epoxy. Such materials have the characteristic of clotting the inner spaces between the cement particles. Silica fume will actually combine chemically with the cement and will improve the properties of the cement. The latex does not chemically combine with the cement, but it can be used to clot the cement pores and thereby reduce the water to cement ratio. The waterbase urethane, acrylic and epoxies produce the same result of clotting as a latex or silica fume.

One of the advantages that the water based acrylic or epoxy has is that if it is combined in the mix and pumped directly into a car after e-coat corrosion protection, it could combine or improve the bond between the cured cement and the e-coated surface. The water based epoxy 35201 manufactured by Interez has basically the same chemistry as e-coat. The e-coat corrosion protection system is a water based epoxy that is baked on through the use of an e-coat oven. Epoxy 35201 has to be catalyzed with a room temperature catalyst such as 826 or an elevated temperature catalyst such as Di-Cy or a Di-Cy combination with an EMI 24.

By adding a water base acrylic or an epoxy to the cementitious mix, mixing the contents and pumping it into an e-coated vehicle, the physical properties of the cement is improved and the bond is increased between the cement core and the rectangular tube or shell.

If additional adhesion is required, the end user could spray the inside surface of the vehicle component, tube or shell with a water born epoxy or acrylic and thereafter the cementitious mix is pumped into the component. The adhesion is enhanced due to the precoating of the inner surface of the tube. The sprayed coat may be the same material that is used in the inclusion of the cement during the mixing stage.

In manufacturing a door beam, it is not required to bond the cement core to the inside surface of the rectangular tube or component. Silica fume is added to the cement water paste to improve moisture resistance of the door beam.

Another alternate means of reducing a moisture retention problem in the door beam is to end seal the ends of the core after the core is placed into the beam. The ends of the core may be sealed by using a thermoplastic adhesive or a wax spray or coating on the ends of the core.

In using a Portland Cement-Expancel 551 DE mix, a cured core was placed under water for 30 days. It was found there was an increase in weight of 20%. It was also found that the inclusion of either EMSAC, latex or a water base epoxy in the Portland Cement-Expancel 551 DE mix, the maximum amount of water retention in a cured core after 30 days of submergence in water is 3% of the weight of the total product.

Thus, for a door beam application, there is a trade-off between inclusion of the EMSAC or sealing ends, although the EMSAC is relatively inexpensive compared to the additional steps and material required to seal the ends of the cured core.

For those areas which require volumes larger than 0.50 gallon per component, it will be necessary to foam the mix during the pumping stage by introducing air into the pumping system to foam the cement as it comes out of a pumping nozzle. An additional foaming agent can be added to the mix.

Elastizell Corp. of America of Ann Arbor, Mich. provides a lightweight foam cement and is the manufacturer of a chemical concentrate formulation called —ELASTIZELL— TM .

Elastizell Corporation of America starts with a cement that is relatively heavy, 100 pounds per cubic feet, water is added to the cement and the wet cement is processed through the ELASTIZELL system which yields a cement down to 20 pounds per cubic feet, with a compressive strength of 10 psi. At 80 pounds per cubic feet the ELASTIZELL cement foam has a compressive strength of 500 psi.

The Portland Cement-Expancel 551 DE mixture, without any EMSAC or latex, has a compressive strength of 750 psi and a density of 75 pounds per cubic feet. Adding latex, water born acrylics or epoxies to the mix increases the compressive strength at the same density (75 lbs/ft$^3$) to 1,200 to 1,500 psi.

The raw material cost of the Standard Mix (Formula V) applied to a 1 inch $\times$ 3 inch rectangular tube for a door beam is approximately 25 cents per door beam. The raw material cost of the cheapest resin syntactic mix is approximately 40 cents for the same size tube. Even though there is a slight mass penalty with the cement system of about 0.40 pound, the current cost advantage outweighs a syntactic foam core using a thermoset or a thermoplastic based chemistry. The performance of a door beam with either a cement or a resin cured core is approximately the same based on actual test results.

In place of the Expancel 551 DE thermoplastic microspheres, other microspheres could be used as the microspheres products of 3M Company called C15 or B23. The C15 microsphere has a density of 6.3 pounds per cubic feet while the B23 microsphere has a density of 9 pounds per cubic feet. The C15 and B23 microspheres are rigid glass systems which are not suitable with the ELASTIZELL type of pumping equipment because of the high pumping shear, although the C15 and B23 microspheres can be used in an extrusion type of application intended for a door beam.

A 3M Company ceramic macrosphere product called —MACROLITE— or a SG fly ash bubble could also be used in the mix in place of the Expancel 551 DE. However, the density is 25 pounds per cubic feet requiring the mass to be appreciably increased when using the SG bubble or the 3M ceramic microsphere alone. However, the SG bubble-cement mix can be pumped through an ELASTIZELL type of foaming system because the SG bubble has a crush strength rated at 2,000 psi. The 3M ceramic macrosphere, which has a 750 psi maximum crush strength, should not be used with the ELASTIZELL equipment although it may be used in the cement mix and then extruded to produce cured cement core suitable for use in the tube of a vehicle door beam.

Either the 3M ceramic microsphere or SG bubble could be added to the cement mix in combination with the Expancel 551 DE and silica fume to reduce the density by including a certain percentage of the SG bubble or the 3M ceramic microsphere in the cement mix. In one example, the density of the mix was reduced from 76 pounds per cubic feet to 64 pounds per cubic feet by adding the SG bubble, without much increase in cost and with no sacrifice in the physical properties of the finished products. A further example of a lightweight mix is Formula VI indicated previously. The SG fly ash particles may have a range from 20 parts to 40 parts by weight of cement.

At the present time, the cement water base system disclosed herein for use in making a cementitious core has many advantages over the resin based systems including savings in the costs of the core materials, improved temperature resistance of the cured cement core and improved stiffness of the cement based system when compared, as an example, to the polyester syntactic core. One area which requires further investigation relates to the strength to weight ratio of the cement base system.

While particular embodiments of this invention are shown and described herein, it will be understood, of course, that the invention is not to be limited thereto since many modifications may be made, particularly by those skilled in this art, in light of this disclosure. It is contemplated, therefore, by the appended claims, to cover any such modifications as fall within the true spirit and scope of this invention.

What is claimed is:

1. A lightweight, composite reinforcing door beam adapted to be mounted in the cavity of a motor vehicle door which has an outer panel and an inner panel, the door beam providing structural reinforcement in the form of increased side-impact resistance when mounted in the cavity of the vehicle door, the door beam comprising:
   a metal tube having a longitudinal axis and having a bore coextensive therewith;
   a reacted core disposed in said bore of said metal tube, said core occupying not more than one-third of the length of said bore;
   said core being positioned substantially at the midspan of said metal tube;
   said core being held in place in said bore of said tube;
   first and second mounting means disposed at opposite ends of said body and adapted for mounting the door beam in the cavity of the vehicle door, with the longitudinal axis of the door beam positioned horizontally with respect to the vehicle door, thereby increasing the side-impact resistance of the vehicle door; and
   said reacted core being selected from a group consisting of synthetic resin and Portland cement.

2. The lightweight, composite reinforcing door beam recited in claim 1, wherein said door beam is mounted to said inner panel of said vehicle door.

3. The lightweight, composite reinforcing door beam recited in claim 1 wherein said reacted core comprises from about 35 to about 95 by weight synthetic resin, from about 1 to about 60 by weight cell-forming agent, and from about 1.0 to about 55 by weight filler.

4. A lightweight, composite reinforcing door beam adapted to be mounted in the cavity of a motor vehicle door which has an outer panel and an inner panel, the door beam providing structural reinforcement in the form of increased side-impact resistance when mounted in the cavity of the vehicle door, the door beam comprising:
   a metal tube having a longitudinal axis and having a bore coextensive therewith;
   a reacted core disposed in said bore of said metal tube, said core occupying not more than one-third of the length of said bore;
   said core being positioned substantially at the midspan of said metal tube;
   said core being held in place in said bore of said tube;
   first and second mounting means disposed at opposite ends of said body and adapted for mounting the door beam in the cavity of the vehicle door, with the longitudinal axis of the door beam positioned horizontally with the respect to the vehicle door, thereby increasing the side-impact resistance of the vehicle door; and
   said reacted core comprising about 100 parts by weight Portland cement and about 0.3% to 2.0% by weight of cement of the thermoplastic microspheres.

5. A lightweight, composite reinforcing door beam adapted to be mounted in the cavity of a motor vehicle door which has an outer panel and an inner panel, the door beam providing structural reinforcement in the form of increased side-impact resistance when mounted in the cavity of the vehicle door, the door beam comprising:
   a metal tube having a longitudinal axis and having a bore coextensive therewith;
   a reacted core disposed in said bore of said metal tube, said core occupying not more than one-third of the length of said bore;
   said core being positioned substantially at the midspan of said metal tube;
   said core being held in place in said bore of said tube;
   first and second mounting means disposed at opposite ends of said body and adapted for mounting the door beam in the cavity of the vehicle door, with the longitudinal axis of the door beam positioned horizontally with respect to the vehicle door, thereby increasing the side-impact resistance of the vehicle door; and
   said reacted core comprising generally equal volumes of Portland cement and thermoplastic microspheres.

6. The lightweight, composite reinforcing door beam recited in claim 4 wherein the water in said reacted core comprises about 40%, to about 60% of the weight of the cement.

7. The lightweight, composite reinforcing door beam recited in claim 4 wherein the silica fume in said reacted core comprises about 5% to 20% by weight of the cement.

8. The lightweight, composite reinforcing door beam recited in claim 4 wherein the SG fly ash particles of said reacted core comprises about 20% to 40% by weight of the cement.

9. The lightweight, composite reinforcing door beam recited in claim 6 wherein air is introduced into the core when in a wet state to foam the cement thereby producing a lightweight foam cement.

10. A lightweight, composite reinforcing door beam adapted to be mounted in the cavity of a motor vehicle door which has an outer pamel and an inner panel, the door beam providing structural reinforcement in the form of increased side-impact resistance when mounted in the cavity of the vehicle door, the door beam comprising:
   a metal tube haivng a longitudinal axis and having a bore coextensive therewith;
   a reacted core disposed in said bore of said metal tube, said core occupying not more than one-third of the length of said bore;
   said core being positioned substantially at the midspan of said metal tube;
   said core being held in place in said bore of said tube;
   first and second mounting means disposed at opposite ends of said body and adapted for mounting the door beam in the cavity of the vehicle door, with the longitudinal axis of the door beam positioned horizontally with respect to the vehicle door, thereby increasing the side-impact resistance of the vehicle door; and said reacted core comprising Portland cement and a filler, in generally equal volumes.

11. The lightweight, composite reinforcing door beam recited in claim 10 wherein said filler is selected from the group consisting of glass microspheres, plastic microspheres, silica fume, fly ash particles and ceramic macrospheres.

12. The lightweight, composite reinforcing door beam recited in claim 1, wherein said first and second mounting means are end pieces and said end pieces are integral with said tube.

13. The lightweight, composite reinforcing door beam recited in claim 3, wherein said synthetic resin is selected from the group consisting of thermoplastic and thermosetting resins.

14. The lightweight, composite reinforcing door beam recited in claim 3, wherein said cell-forming agent comprises microspheres.

15. The lightweight, composite reinforcing door beam recited in claim 3, wherein said cell-forming agent comprises a blowing agent selected from the group consisting of chemical blowing agents and physical blowing agents.

16. The lightweight, composite reinforcing door beam recited in claim 3, wherein said filler is selected from the group consisting of glass microspheres, plastic microspheres, silica fume, calcium carbonate, milled glass fiber and chopped glass strand.

17. A reinforced vehicle door comprising:
an inner door panel and an outer door panel joined to define a door cavity;
a lightweight, composite door beam within said door cavity;
said door beam having a longitudinal metal tube that defines a bore;
an inorganic cementitious core disposed in said bore, said core occupying no more than one-third of the length of said bore;
said core being positioned substantially at the midspan of said metal tube;
said core being held in place in said bore of said tube; and
first and second mounting means disposed at opposite ends of said metal tube for mounting said door beam in said cavity of said vehicle door.

18. The reinforced vehicle door recited in claim 17, wherein said cementitious core includes Portland cement and a filler, in generally equal volume.

19. The reinforced vehicle door recited in claim 17, wherein said first and second mounting means are end pieces and said end pieces are integral with said metal tube.

20. The reinforced vehicle door recited in claim 17, wherein said filler is selected from the group consisting of glass microspheres, plastic microspheres, silica fume, fly ash particles and ceramic macrospheres.

21. A method of forming an impact beam comprising the following steps:
(a) providing a metal tube defining a bore;
(b) providing an inorganic cementitious core adapted to be received within said metal tube, said cementitious core having a length not greater than one-third the length of said metal tube; and
(c) sliding said cementitious core into said bore of said metal tube such that said core occupies the midspan of said metal tube.

22. The method recited in claim 21, further including the steps of forming first and second mounting means integral with said metal tube.

23. The method recited in claim 21, wherein said cementitious core comprises Portland cement and a filler, in generally equal volumes.

24. The method recited in claim 23, wherein said filler is selected from the group consisting of glass microspheres, plastic microspheres, silica fume and fly ash particles.

25. A composite structural article for use in vehicles comprising:
a hollow metal component having a longitudinal axis; and
an inorganic cementitious core disposed in the interior of said metal component, and located therein in the area of high stress concentration;
said cementitious core being heold in place in the interior of said component.

26. The composite structural article recited in claim 25 wherein said cementitious core comprises about 100 parts by weight Portland cement and about 0.3% to 2.0% by weight of cement of the thermoplastic microspheres.

27. The composite structural article recited in claim 25 wherein said cementitious core comprises generally equal volumes of Portland cement and a filler.

28. The composite structural article recited in claim 27 wherein the filler is thermoplastic microspheres.

29. The composite structural article recited in claim 27 wherein said filler is selected from the group consisting of glass microspheres, plastic microspheres, silica fume, fly ash particles and ceramic macrospheres.

* * * * *